(12) United States Patent
Casimiro et al.

(10) Patent No.: US 7,451,779 B2
(45) Date of Patent: Nov. 18, 2008

(54) UNIVERSAL MOUNTING BRACKET FOR PRESSURE TRANSMITTERS EMULATORS

(75) Inventors: Richard P. Casimiro, North Kingstown, RI (US); Steven D. Lantagne, Seekonk, MA (US)

(73) Assignee: Invensys Systems, Inc., Foxboro, MA (US)

( * ) Notice: Subject to any disclaimer, the term of this patent is extended or adjusted under 35 U.S.C. 154(b) by 604 days.

(21) Appl. No.: 10/918,174

(22) Filed: Aug. 13, 2004

(65) Prior Publication Data

US 2006/0032997 A1    Feb. 16, 2006

(51) Int. Cl.
*F16K 11/20* (2006.01)
*F16K 49/00* (2006.01)
(52) U.S. Cl. .......................... 137/356; 137/343; 248/65
(58) Field of Classification Search ................. 137/343, 137/356, 597, 594; 248/49–74.5; 251/143
See application file for complete search history.

(56) References Cited

U.S. PATENT DOCUMENTS

| | | | | |
|---|---|---|---|---|
| 2,974,918 A | * | 3/1961 | Voigtlander | 248/201 |
| 3,232,568 A | * | 2/1966 | Lennon et al. | 248/67 |
| 4,193,420 A | * | 3/1980 | Hewson | 137/356 |
| 5,762,100 A | * | 6/1998 | Wilda et al. | 137/341 |
| 6,176,262 B1 | * | 1/2001 | Nimberger | 137/597 |
| 6,547,192 B2 | * | 4/2003 | Rinderer et al. | 248/49 |
| 2004/0124318 A1 | * | 7/2004 | Hoffmann | 248/49 |

OTHER PUBLICATIONS

Product Data Sheet 00813-0100-4001, Rev EA, May 2004; Rosemount 3051 Pressure Transmitter (46 Pages).
Dimensional Print; DP 020-447, Oct. 2001; I/A Series Pressure Transmitters, Invensys (4 Pages).
Data Sheet SS/265DS_3; Field IT; 2600T Series Pressure Transmitters; Model 265DS Differential selectable maximum working pressure up to 41MPa, 5945psi; ABB 2004 (16 Pages).
Dimensional Print; DP 020-446, Nov. 2003; I/A Series Pressure Transmitters; Invensys (4 Pages).
Data Sheet SS/265GS/AS_3; Field IT, 2600T Series Pressure Transmitters; Model 265GS Gauge, Model 265AS Absolute, standard overload; ABB 2004 (20 pages).

* cited by examiner

*Primary Examiner*—John Rivell
*Assistant Examiner*—Cloud K Lee
(74) *Attorney, Agent, or Firm*—Sampson & Associates, P.C.

(57) ABSTRACT

A universal mounting bracket is provided for coplanar and bi-planar differential pressure (DP) transmitters, and gauge pressure transmitters. The bracket includes a support defining a plurality of planes, with at least two sets of bracket mounts disposed on mutually orthogonal planes. At least two sets of coplanar DP transmitter mounts are also disposed on mutually orthogonal planes, and at least one set of bi-planar DP transmitter mounts is configured for mounting the bi-planar DP transmitter in any one of a plurality of mutually orthogonal orientations. The bracket also includes at least two sets of gauge pressure transmitter mounts on mutually orthogonal planes.

16 Claims, 4 Drawing Sheets

UNIVERSAL MOUNTING BRACKET FOR PRESSURE TRANSMITTERS EMULATORS

BACKGROUND

1. Technical Field

This invention relates to pressure sensor transmitters, and more particularly to a single mounting bracket capable of securing transmitters of various distinct configurations within a manufacturing environment.

2. Background Information

Throughout this application, various publications, patents and published patent applications are referred to by an identifying citation. The disclosures of the publications, patents and published patent applications referenced in this application are hereby incorporated by reference into the present disclosure.

Electronic pressure transmitters are widely used in the field of factory automation, and generally refer to electronic pressure transducers capable of generating an electrical output in the range of 4-20 mA. These transmitters may be used to capture pressure data from a manufacturing process, and then transmit the data to an electronic factory automation system.

Pressure transmitters are typically configured to measure absolute pressure, gauge (or gage) pressure, and differential pressure (DP). Due to their distinct constructions, DP transmitters and Gauge transmitters generally have distinct mounting requirements. Mounting requirements may also vary among manufacturers. Generally speaking, most DP transmitters fall into two distinct configurations, known in the industry as bi-planar and coplanar. This terminology was based on the historical placement of pressure diaphragms within the particular transmitter types. Today however, this terminology simply refers to particular mounting interfaces, regardless of the internal construction of the transmitter.

The bi-planar pressure transmitters typically have a mounting interface that utilizes a 'DIN' style mounting pattern of four 7/16 inch diameter bolts on a rectangular bolt pattern of 2.126×1.626 inches. The coplanar pressure transmitters generally use two 3/8 inch diameter bolts spaced approximately 3.35 inches apart.

Gauge and absolute pressure transmitters also use various mounting techniques. Many use a conduit hole in their housings for mounting, i.e., they simply mount onto a conduit coupling the sensor to the process. Others mount by clamping the body of the transmitter to a bracket, while still others mount by bolting the transmitter directly to a bracket.

Currently, installation and maintenance personnel must stock a wide variety of transmitter mounting hardware in order to install and maintain a typical factory automation system. This requirement is not only relatively cumbersome, but also tends to increase inventory costs, due to increased storage space and tracking requirements.

Thus, a need exists for a single mounting device and system that may be used to fasten a wide variety of transmitters of various interface types.

SUMMARY

One aspect of the invention includes a universal mounting bracket for coplanar and bi-planar differential pressure (DP) transmitters, and gauge pressure transmitters. The bracket includes a support defining three mutually orthogonal planes, and at least two sets of bracket mounts respectively disposed on first and second mutually orthogonal planes. The bracket mounts include U-clamps. The bracket further includes at least two sets of coplanar DP transmitter mounts respectively disposed on first and third mutually orthogonal planes, and at least one set of bi-planar DP transmitter mounts disposed on the first plane, configured for mounting the bi-planar DP transmitter in any one of a plurality of mutually orthogonal orientations. A plurality of process apertures are interspersed among the bi-planar DP transmitter mounts. At least two sets of gauge pressure transmitter mounts are respectively disposed on the first and third mutually orthogonal planes, with the gauge pressure transmitter mounts including U-clamps. The support also includes a tubular frame and a plate coupled to the frame.

Another aspect of the invention includes a universal mounting bracket for coplanar and bi-planar differential pressure (DP) transmitters, and gauge pressure transmitters. The bracket includes a support defining a plurality of planes, with at least two sets of bracket mounts disposed on mutually orthogonal planes. At least two sets of coplanar DP transmitter mounts are also disposed on mutually orthogonal planes, and at least one set of bi-planar DP transmitter mounts is configured for mounting the bi-planar DP transmitter in any one of a plurality of mutually orthogonal orientations. The bracket also includes at least two sets of gauge pressure transmitter mounts on mutually orthogonal planes.

In still another aspect of the invention, a universal mounting bracket is provided for coplanar and bi-planar differential pressure (DP) transmitters, and gauge pressure transmitters. The bracket includes support means which defines a plurality of planes, at least two sets of bracket mounting means located on mutually orthogonal planes, and at least two sets of means for mounting a coplanar DP transmitter located on mutually orthogonal planes. At least one set of means for mounting a bi-planar DP transmitter is configured for mounting the bi-planar DP transmitter in any one of a plurality of mutually orthogonal orientations. At least two sets of means for mounting a gauge pressure transmitter are respectively disposed on mutually orthogonal planes.

Yet another aspect of the invention includes a method for fabricating a universal mounting bracket for coplanar and bi-planar differential pressure (DP) transmitters, and gauge pressure transmitters. The method includes providing a support defining a plurality of planes, respectively placing at least two sets of bracket mounts on mutually orthogonal planes, and respectively placing at least two sets of coplanar DP transmitter mounts on mutually orthogonal planes. This method also includes providing a set of bi-planar DP transmitter mounts configured for mounting the bi-planar DP transmitter in any one of a plurality of mutually orthogonal orientations, and respectively disposing at least two sets of gauge pressure transmitter mounts on mutually orthogonal planes.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
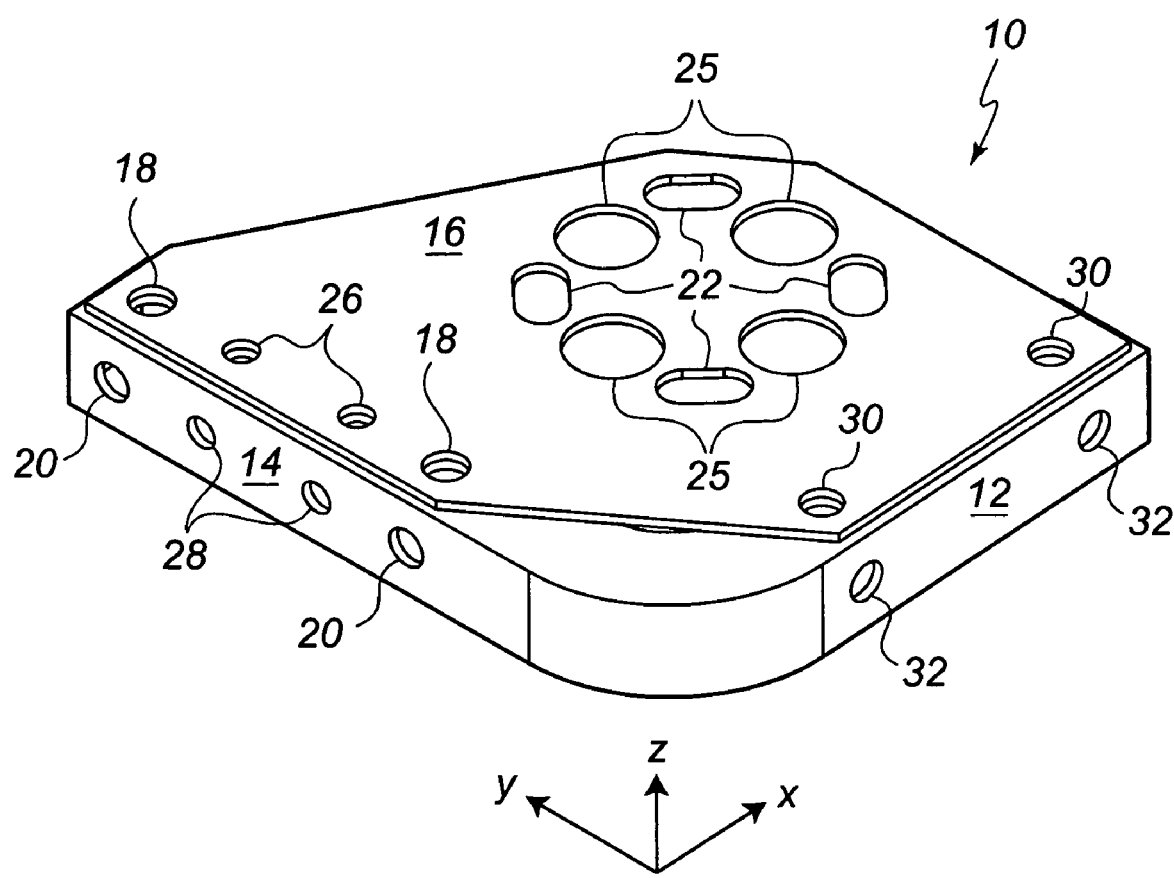
FIG. 1 is a perspective view of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Referring to the figures, an embodiment of the present invention includes a universal mounting bracket 10 configured for mounting any of various types of pressure transmitters to a manufacturing process for the capture of pressure data. This embodiment thus provides a single device that is capable of mounting coplanar DP transmitters, bi-planar DP transmitters, gauge pressure transmitters, and absolute pressure transmitters in a wide variety of orientations. The bracket also includes provisions for securing itself in a wide variety of orientations to the process being measured. Advantageously, the present invention tends to reduce the number of discrete mounting devices that must be carried by installation and maintenance personnel in order to install and maintain a typical factory automation system. The invention also tends to reduce inventory costs due to decreased use of storage space and tracking requirements.

Where used in this disclosure, the term axial refers to a direction substantially parallel to the central axis of pipe 44, 44' at the point of engagement of the pipe with bracket 10.

Turning to FIG. 1, bracket 10 includes wall portions 12 and 14, and plate 16, disposed in three mutually orthogonal planes. Referring to the coordinate axes of FIG. 1, walls 12 and 14 are disposed in the xz and yz planes, respectively, while plate 16 is disposed in the xy plane.

The bracket includes two sets of coplanar DP transmitter mounts 18 and 20, respectively disposed on plate 16 and wall 14. A set of bi-planar DP transmitter mounts 22 are located on plate 16, which enable a bi-planar DP transmitter to be mounted in any one of at least two (e.g., four in the embodiment shown) mutually orthogonal orientations. Process apertures 25 are also interspersed at predetermined locations among mounts 22 to enable process conduits (e.g., high and low pressure conduits) 46 and 47 (FIG. 5) to extend therethrough for coupling to the transmitter in a conventional manner. Gauge/absolute pressure transmitter mounts 26 and 28 are respectively located on plate 16 and wall 14 for use as also discussed below. Bracket mounts 30 and 32 are located on plate 16 and wall 12, respectively.

In the particular embodiment shown, bracket 10 may be conveniently fabricated from tubing (e.g., of square cross-section) bent 90 degrees to form walls 12 and 14 to form a tubular frame. Plate 16 may then be welded or otherwise fastened to the tubular frame as shown. Plate 16 advantageously serves as a gusset which reinforces the structural rigidity of the tube. The plate 16 also provides sufficient surface area for the bi-planar mounts 22. Moreover, plate 16 may be used as a working platform for holding tools and hardware while installing or servicing the transmitter coupled thereto, as will be discussed in greater detail below. One skilled in the art will recognize that the tubular frame may be formed integrally with the plate, such as from sheet material using appropriate die sets.

Figure 3:
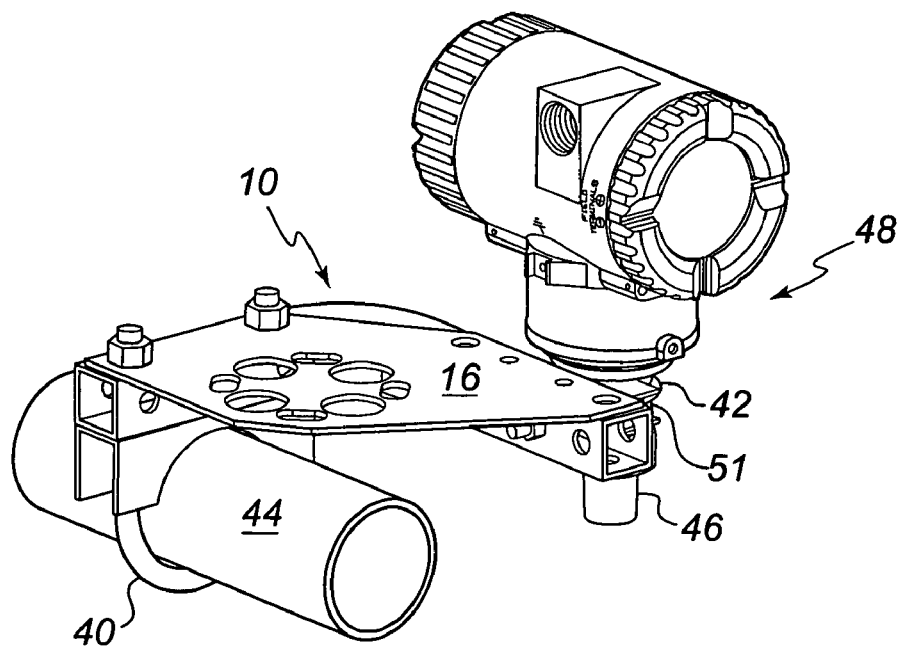
FIG. 3 is a perspective view of the embodiment of FIG. 1, in a representative installation of a gauge pressure transmitter.

In this embodiment, mounts 18, 20, 22, 26, 28, 30 and 32 are configured as mounting holes. Gauge/absolute pressure transmitter mounts 26 and 28, and bracket mounts 30 and 32, may include U-clamps 40 and 42 usable in a conventional manner to securely engage a process pipe 44 or elongated neck 51 of a gauge transmitter 48 (FIG. 3).

Bracket 10 may be fabricated from substantially any material capable of withstanding the stresses of the particular intended application. Suitable materials may include steel, aluminum, stainless steel, brass, and alloys thereof. Non-metallic materials may also be used, such as fiberglass, carbon fiber, and aramid (e.g., KEVLAR®, DuPont) composites, and various plastics such as ABS and PVC.

Figure 2:
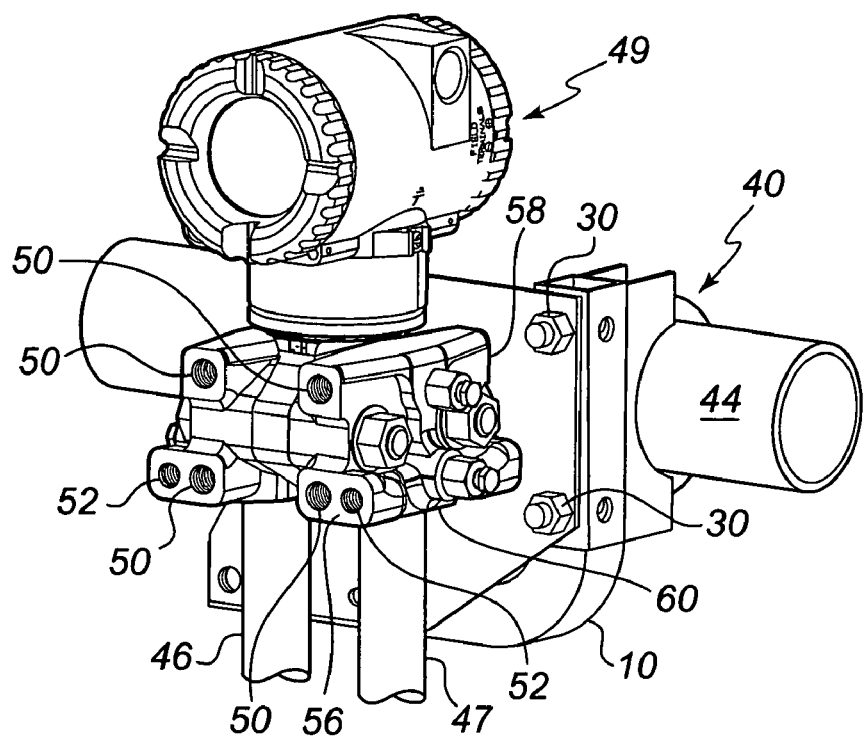
FIG. 2 is a perspective view of the embodiment of FIG. 1, in a representative installation of a DP transmitter.
Figure 6:
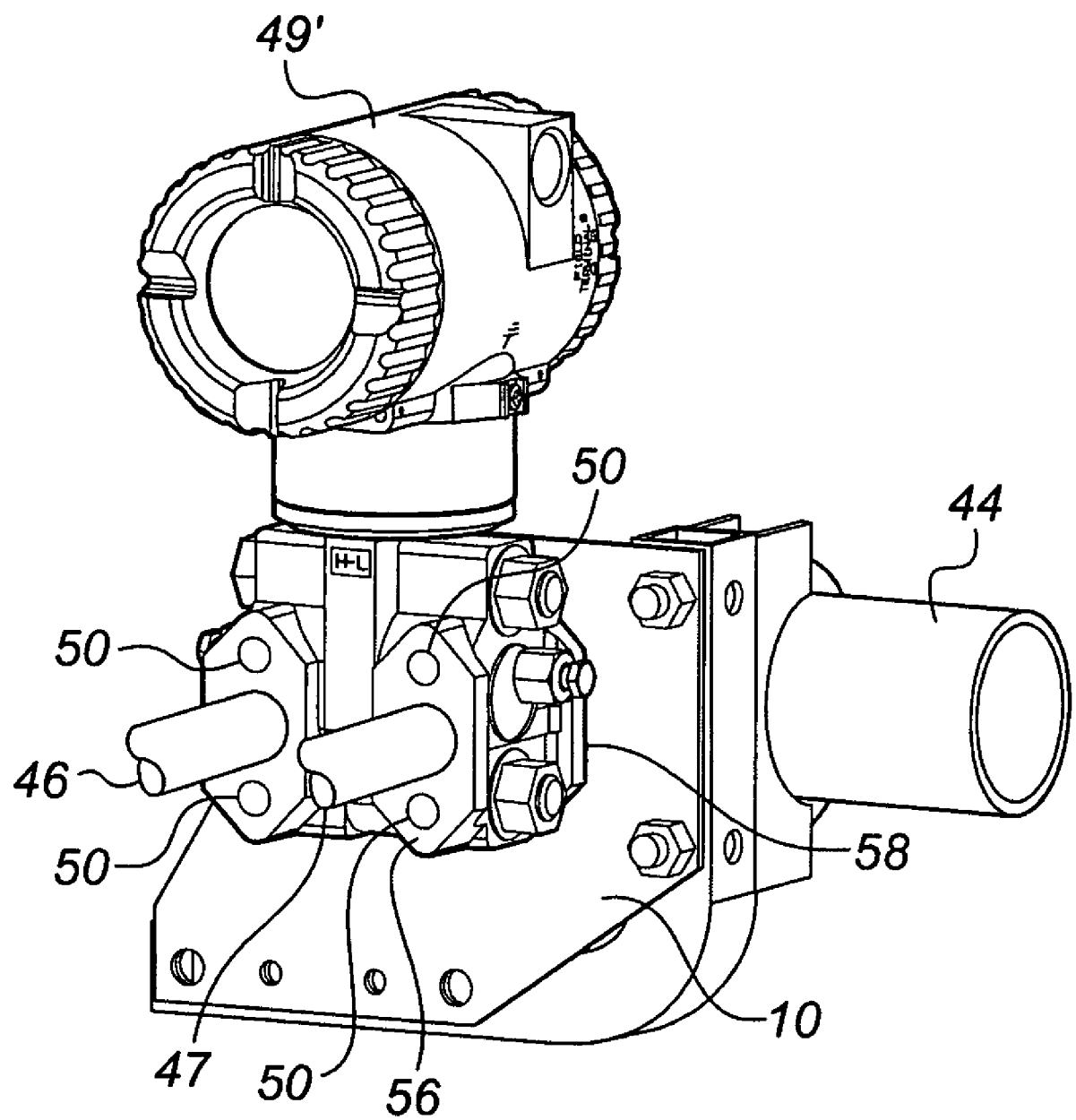

Turning now to FIG. 2, bracket 10 is shown mounted to a pipe 44 using a U-clamp 40 fastened to mounts 30 (FIG. 1). In this particular configuration, plate 16 extends nominally parallel to the axis of pipe 44. This enables plate 16 to extend vertically when fastened to a horizontally extending pipe 44 as shown. A combination bi-planar/coplanar mount DP transmitter 49 is secured to bi-planar mounts 22 (FIG. 1) of the bracket. A suitable transmitter 49 is available from the Foxboro Company (Foxboro, Mass., USA), and is disclosed in U.S. patent application Ser. No. 10/854,909, entitled Bi-Planar Differential Pressure Transmitter with Orthogonal Process Connections, filed on May 27, 2004, which is fully incorporated herein by reference. However, conventional bi-planar style transmitters 49' may also be used, such as shown in FIG. 6 and discussed below.

DP transmitter 49 is equipped with both bi-planar and coplanar style mounting arrangements (e.g., with threaded bores disposed in mounting patterns described above, denoted at 50 and 52, respectively). Full sets of mounting arrangements 50 are disposed on three sides of transmitter 49, (e.g., on elevations 56 & 58, and on base 60). Two full sets of mounting arrangements 52 are provided on two sides of the transmitter, (e.g., on elevations 56 & 58). Process conduits 46 and 47 are coupled to base 60 of transmitter 49 in a conventional manner.

As will become evident in light of the following discussion, the combination of various mounts on bracket 10 and on transmitter 49 advantageously provide a user with a relatively wide range of mounting options with a small number of discrete components.

Turning to FIG. 3, bracket 10 is mounted to a pipe 44 substantially as discussed above with respect to FIG. 2, with plate 16 extending parallel to the axis of pipe 44. In this particular embodiment, however, the bracket is rotated 90 degrees from that shown in FIG. 2 to form a nominally horizontal platform. Bracket 10 is engaged with a Gauge Pressure transmitter 48 using a U-clamp 42 and gauge mounts 28. Transmitter 48 includes an elongated neck 51 of sufficient length to enable such engagement. Neck 51 is also configured to engage a conventional process conduit 46. Thus, in this embodiment, traditional conduit style mounting is combined with the use of clamp 42 to effect a particularly secure installation. An exemplary Gauge Pressure transmitter 48 is commercially available from the Foxboro Company.

Figure 4:
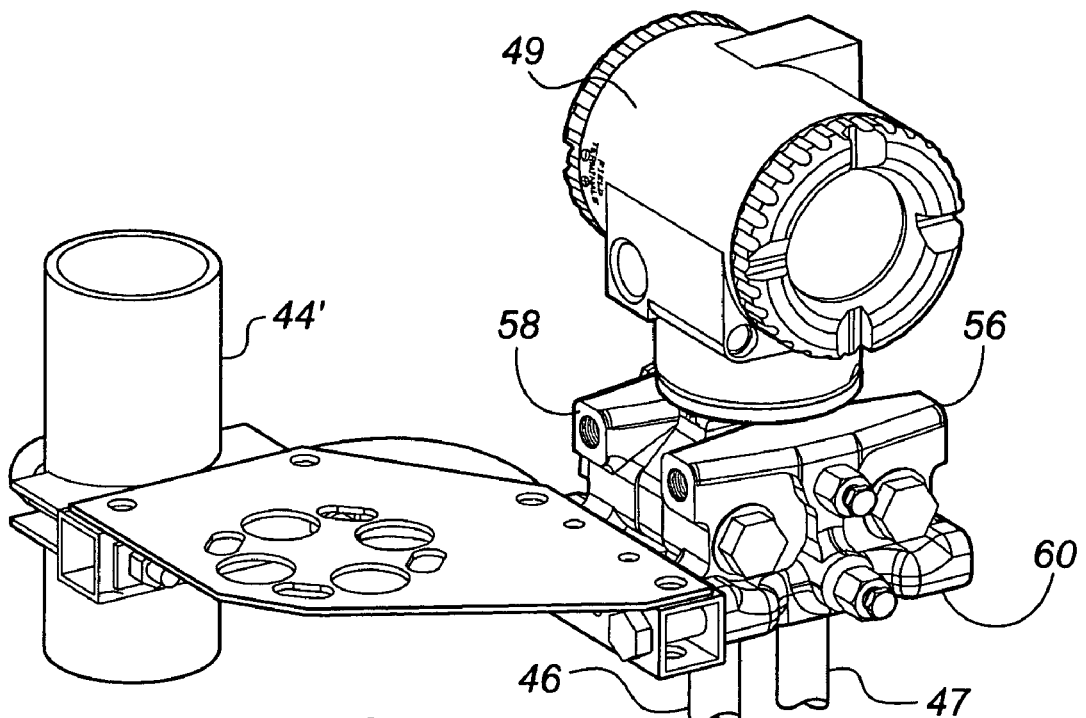
FIGS. 4-6 are views similar to that of FIG. 2, of other representative installations of a DP transmitter.

Turning now to FIG. 4, an example of coplanar mounting is shown. In this embodiment, bracket 10 is mounted to a pipe 44' in the manner discussed above with respect to pipe 44. Pipe 44' is offset 90 degrees relative to pipe 44 (e.g., to extend vertically as shown). In addition, bracket 10 is also rotated 90 degrees from that shown in FIG. 2 to form a nominally horizontal platform extending orthogonally to the axis of pipe 44'.

As shown, coplanar mounts 20 (FIG. 1) are used to fasten bracket 10 to mounting holes 52 (FIG. 2) of DP transmitter 49. Process conduits 46 and 47 are coupled to base 60 of transmitter 49 in a conventional manner.

Figure 5:
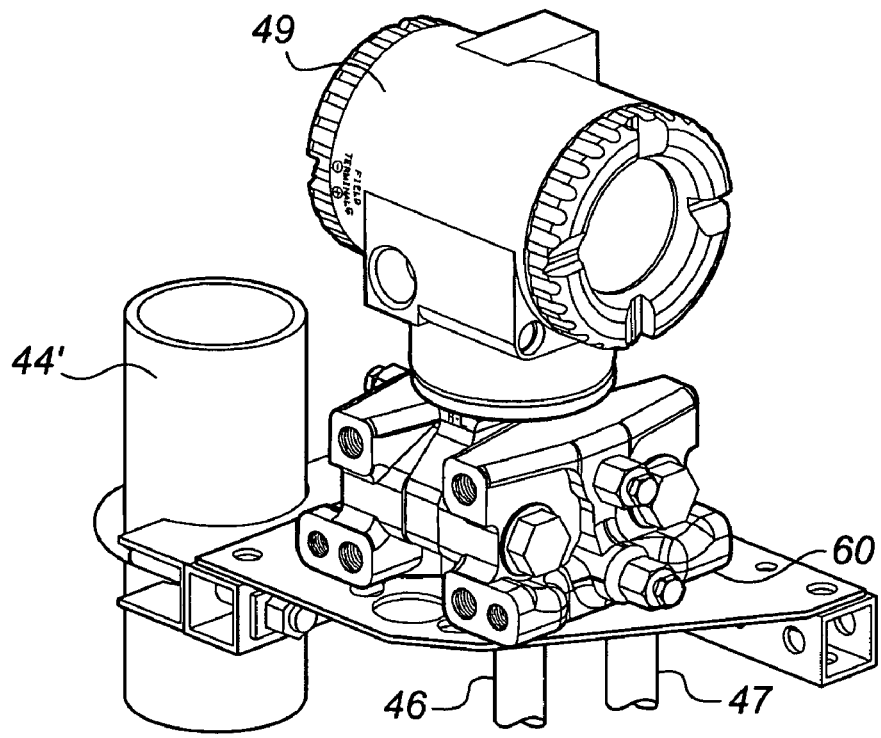

Referring to FIG. 5, bracket 10 is fastened to pipe 44' in substantially the same manner as shown in FIG. 4. In this embodiment however, bi-planar mounts 22 (FIG. 1) are used to fasten bi-planar mounting holes of face 60 (FIG. 2) of DP transmitter 49 to bracket 10. Process conduits 46 and 47 are coupled to transmitter 49 in a conventional manner, and extend through process apertures 25 (FIG. 1).

As mentioned above, the embodiment of FIG. 6 is in many respects similar to that of FIG. 2, though using a conventional DP transmitter 49' of the type having conventional bi-planar mounting holes 50 on opposite faces 56 and 58 thereof.

Those skilled in the art should recognize that the symmetry of the bi-planar mounts 22 in combination with the redundant placement of process apertures 25, advantageously enables a particular face of transmitter 49, 49' to be fastened in any one of four orientations on plate 16.

Moreover, although a particular construction for bracket 10 has been shown and described, the skilled artisan should recognize that substantially any construction having three mutually orthogonal sides, such as in the form of three sides of a cube, having mounts disposed as described herein, should be considered within the scope of the invention. In addition, although the bracket 10 has been shown and described having mounts suitable for the use of threaded fasteners (e.g., screws or bolts), nominally any type of mount and/or fastener may be used, without departing from the spirit and scope of the present invention.

Also, embodiments of this invention have been described as having mounts disposed in particular patterns. The skilled artisan should recognize that the industry may from time to time modify these patterns and/or adopt new patterns, and that such changes are well within the scope and spirit of the present invention.

It should also be recognized that although bracket 10 has been shown and described as useful in conjunction with pressure transmitters, it is contemplated that nominally any type of transmitter may be supported by the disclosed embodiments without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A universal mounting bracket for coplanar and bi-planar differential pressure (DP) transmitters, and gauge pressure transmitters, the bracket comprising:
   a support defining three mutually orthogonal planes;
   at least two sets of bracket mounts respectively disposed on first and second mutually orthogonal planes, the bracket mounts including U-clamps;
   at least two sets of coplanar DP transmitter mounts of a first size, respectively disposed on first and third mutually orthogonal planes, each set of coplanar DP transmitter mounts defining a first pattern;
   at least one set of bi-planar DP transmitter mounts disposed on the first plane, configured for mounting the bi-planar DP transmitter in any one of a plurality of mutually orthogonal orientations;
   each set of bi-planar DP transmitter mounts including at least four apertures of a second size, respectively disposed along each side of a notional square to define a second pattern;
   at least four process apertures of a third size, interspersed between the at least four apertures;
   at least two sets of gauge pressure transmitter mounts respectively disposed on the first and third mutually orthogonal planes, the gauge pressure transmitter mounts including U-clamps; and
   the support including a tubular frame and a plate coupled to the frame.

2. A universal mounting bracket for coplanar and bi-planar differential pressure (DP) transmitters, and gauge pressure transmitters, the bracket comprising:
   a support defining a plurality of planes;
   at least two sets of bracket mounts respectively disposed on mutually orthogonal planes;
   at least two sets of coplanar DP transmitter mounts of a first size, respectively disposed on mutually orthogonal planes, each set of coplanar DP transmitter mounts defining a first pattern;
   at least one set of bi-planar DP transmitter mounts configured for mounting the bi-planar DP transmitter in any one of a plurality of mutually orthogonal orientations;
   each set of bi-planar DP transmitter mounts including at least four apertures of a second size, respectively disposed along each side of a notional square to define a second pattern, with at least four process apertures of a third size interspersed therebetween; and
   at least two sets of gauge pressure transmitter mounts respectively disposed on mutually orthogonal planes.

3. The bracket of claim 2, wherein said bracket mounts are configured for mounting the bracket in at least two mutually orthogonal orientations.

4. The bracket of claim 3, wherein said bracket mounts are configured for mounting the bracket to a pipe.

5. The bracket of claim 4, wherein the bracket mounts comprise U-clamp mounts.

6. The bracket of claim 2, wherein the mounts comprise mounting holes.

7. The bracket of claim 2, wherein the gauge pressure transmitter mounts comprise U-clamp mounts.

8. The bracket of claim 2, wherein said mounts are disposed on three mutually orthogonal planes.

9. The bracket of claim 8, wherein:
   the sets of bracket mounts are respectively disposed on first and second planes;
   the sets of coplanar DP transmitter mounts are respectively disposed on first and third planes;
   the set of bi-planar DP transmitter mounts is disposed on the first plane; and
   the sets of gauge pressure transmitter mounts are respectively disposed on the first and third planes.

10. The bracket of claim 2, wherein the support defines at least three mutually orthogonal planes.

11. The bracket of claim 10, wherein the support comprises:
   a frame; and
   a plate coupled to the frame.

12. The bracket of claim 11, wherein the frame is integral with the plate.

13. The bracket of claim 11, wherein the frame comprises a tubular channel.

14. The bracket of claim 2, being fabricated from a material selected from the group consisting of: steel, aluminum, stainless steel, brass, fiberglass, carbon fiber, aramid fiber, plastic, and combinations and composites thereof.

15. A universal mounting bracket for coplanar and bi-planar differential pressure (DP) transmitters, and gauge pressure transmitters, the bracket comprising:
   support means which defines a plurality of planes;
   at least two sets of means for mounting the bracket respectively disposed on mutually orthogonal planes;
   at least two sets of means for mounting a coplanar DP transmitter, disposed on mutually orthogonal planes, each set of means for mounting a coplanar DP transmitter having mounts of a first size, disposed in a first pattern;
   at least one set of means for mounting a bi-planar DP transmitter, configured for mounting the bi-planar DP transmitter in any one of a plurality of mutually orthogonal orientations;
   each set of means for mounting a bi-planar DP transmitter including at least four apertures of a second size, respectively disposed along each side of a notional square to define a second pattern, with at least four process apertures of a third size interspersed therebetween; and
   at least two sets of means for mounting a gauge pressure transmitter, respectively disposed on mutually orthogonal planes.

16. A method for fabricating a universal mounting bracket for coplanar and bi-planar differential pressure (DP) transmitters, and gauge pressure transmitters, the method comprising:
   (a) providing a support defining a plurality of planes;
   (b) respectively disposing at least two sets of bracket mounts on mutually orthogonal planes;
   (c) respectively disposing at least two sets of coplanar DP transmitter mounts of a first size, on mutually orthogonal planes, each set of coplanar DP transmitter mounts defining a first pattern;
   (d) providing a set of bi-planar DP transmitter mounts configured for mounting the bi-planar DP transmitter in any one of a plurality of mutually orthogonal orientations, each set of bi-planar DP transmitter mounts including at least four apertures of a second size, respectively disposed along each side of a notional square to define a second pattern, with at least four process apertures of a third size interspersed therebetween; and
   (e) respectively disposing at least two sets of gauge pressure transmitter mounts on mutually orthogonal planes.

* * * * *